(12) United States Patent
Zhou et al.

(10) Patent No.: US 9,518,216 B2
(45) Date of Patent: Dec. 13, 2016

(54) MANGANESE-DOPED MAGNESIUM STANNATE LUMINESCENT MATERIAL AND PREPARATION METHOD THEREFOR

(75) Inventors: Mingjie Zhou, Shenzhen (CN); Rong Wang, Shenzhen (CN); Guitang Chen, Shenzhen (CN)

(73) Assignee: OCEAN'S KING LIGHTING SCIENCE & TECHNOLOGY CO., LTD, Shenzhen, Guangdong (CN)

( * ) Notice: Subject to any disclaimer, the term of this patent is extended or adjusted under 35 U.S.C. 154(b) by 111 days.

(21) Appl. No.: 14/399,732

(22) PCT Filed: May 8, 2012

(86) PCT No.: PCT/CN2012/075203
§ 371 (c)(1),
(2), (4) Date: Nov. 7, 2014

(87) PCT Pub. No.: WO2013/166661
PCT Pub. Date: Nov. 14, 2013

(65) Prior Publication Data
US 2015/0083968 A1    Mar. 26, 2015

(51) Int. Cl.
C09K 11/66 (2006.01)
C09K 11/02 (2006.01)
C09K 11/77 (2006.01)
C09K 11/87 (2006.01)

(52) U.S. Cl.
CPC ............. *C09K 11/025* (2013.01); *C09K 11/66* (2013.01); *C09K 11/661* (2013.01); *C09K 11/663* (2013.01); *C09K 11/7731* (2013.01); *C09K 11/87* (2013.01)

(58) Field of Classification Search
CPC .......................... C09K 11/025; C09K 11/7731
See application file for complete search history.

(56) References Cited

U.S. PATENT DOCUMENTS

2005/0170530 A1  8/2005  Sato et al.
2006/0234417 A1  10/2006  Isobe et al.

FOREIGN PATENT DOCUMENTS

| CN | 1865395 A | 11/2006 |
|---|---|---|
| CN | 101302426 A | 11/2008 |
| CN | 101928561 A | 12/2010 |
| CN | 102191054 A | 9/2011 |
| JP | H0326781 A | 2/1991 |
| JP | 2001288467 A | 10/2001 |
| JP | 2007077365 A | 3/2007 |

OTHER PUBLICATIONS

Lei B et al.: "Green emitting long lasting phosphorescence (LLP) properties of Mg2SnO4:Mn2+phosphor", Journal of Luminescence, Elsevier BV North-Hollan, NL, vol. 118, No. 2, Jun. 1, 2006 (Jun. 1, 2006), pp. 173-178, XP028045196, ISSN: 0022-2313, DOI: 10.1016/J.JLUMIN2005.08.010.

*Primary Examiner* — Carol M Koslow
(74) *Attorney, Agent, or Firm* — Shimokaji IP

(57) ABSTRACT

A manganese-doped magnesium stannate luminescent material, which has a molecular formula of: $Mg_{2-x}SnO_4$:$Mn_x$@$SnO_2$@$M_y$, where @ is a coating, where $Mg_{2-x}SnO_4$:$Mn_x$ is an outer shell layer, where $SnO_2$ is an intermediate layer shell, where M is an inner core, where M is a metal nanoparticle, where M is at least one selected among Ag, Au, Pt, Pd, and Cu, where the value of x is $0<x\leq 0.05$, where y is the molar ratio between M and Sn, and where the value of y is $0<y\leq 1\times 10^{-2}$. The manganese-doped magnesium stannate luminescent material is a core-shell structure luminescent material, has a high internal quantum efficiency, great luminescent intensity, and the advantages of great stability and great luminescent properties. A method for preparing the manganese-doped magnesium stannate luminescent material has simple processes, low equipment requirements, and no pollution, is easy to control and applicable for industrial production, and has a broad application prospect.

10 Claims, 1 Drawing Sheet

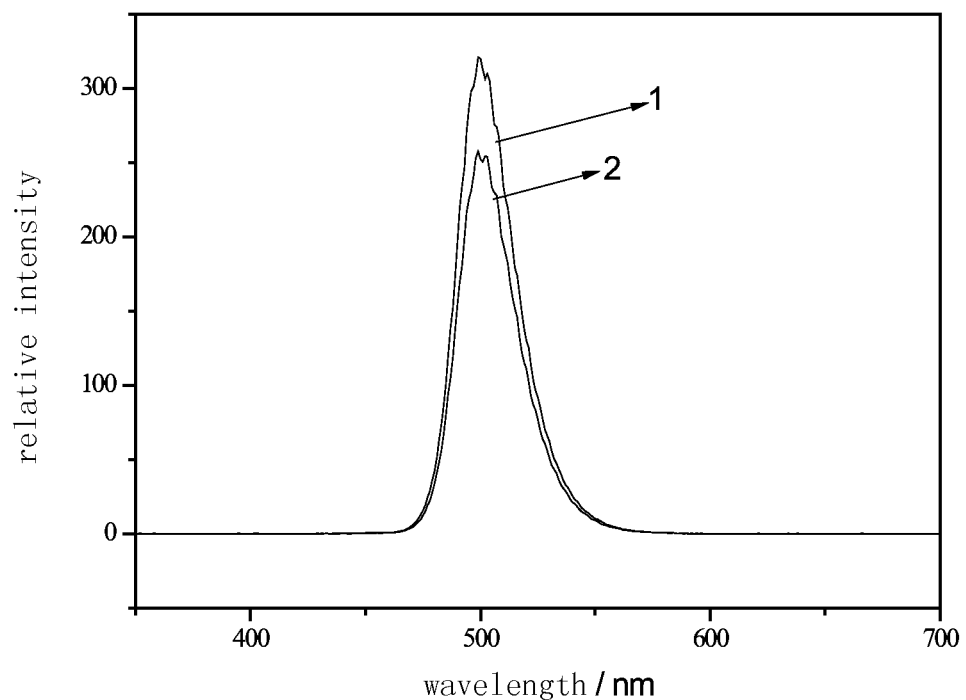

MANGANESE-DOPED MAGNESIUM STANNATE LUMINESCENT MATERIAL AND PREPARATION METHOD THEREFOR

FIELD OF THE INVENTION

The present invention relates to the field of luminescent material, particularly to a manganese-doped magnesium stannate luminescent material and preparation method therefor.

BACKGROUND OF THE INVENTION

Field emission display is an emerging flat panel display. Similar to the working principle of conventional cathode-ray tube (CRT), such new field emission display forms images by electron beam bombarding on fluorescent powders. Compared with other flat panel display (FPD), field emission display has potential advantages in luminance, visual angle, response time, working temperature range, power consumption and other aspects. One key to the excellent properties of FED is preparation of luminescent material. Magnesium stannate has good chemical and thermal stability, internal structural defects is very good for it to obtain good quality. It has potential applications in the field of luminescent material.

SUMMARY OF THE INVENTION

In view of this, the present invention aims to provide manganese-doped magnesium stannate luminescent material having stable structure and strong luminescence. Further, the present invention provides a method for preparing the manganese-doped magnesium stannate luminescent material. The preparation method has simple process, low costs, and no pollution, is easy to control and applicable for industrial production of luminescent material.

In one aspect, the present invention provides a manganese-doped magnesium stannate luminescent material having a chemical formula of $Mg_{2-x}SnO_4:Mn_x@SnO_2@M_y$, where @ denotes coating, $Mg_{2-x}SnO_4:Mn_x$ is outer shell layer, $SnO_2$ is intermediate layer shell, M is inner core, M is metal nanoparticle, M is at least one of Ag, Au, Pt, Pd and Cu, x is in a range of $0 < x \leq 0.05$, y is molar ratio of M to the amount of tin in $SnO_2$, y is in a range of $0 < y \leq 1 \times 10^{-2}$.

Preferably, x is in a range of $0.002 \leq x \leq 0.008$, y is in a range of $1 \times 10^{-5} \leq y < 1 \times 10^{-3}$.

In another aspect, the present invention provides a method for preparing manganese-doped magnesium stannate luminescent material, comprising:

(1) mixing solution of metal salt, additive with reducing agent, then reacting to produce metal nanoparticles colloid, the solution of metal salt is at least one solution of Ag salt, Au salt, Pt salt, Pd salt and Cu salt, the additive is at least one of polyvinylpyrrolidone, sodium citrate, cetyl trimethyl ammonium bromide, sodium dodecyl sulfate and sodium dodecyl sulfonate;

(2) adding metal nanoparticles colloid into solvent and stirring to produce solution containing surface-treated metal nanoparticles, the solvent is selected from the group consisting of aqueous solution of polyvinylpyrrolidone, polyvinyl alcohol, polypropylene glycol and cetyl trimethyl ammonium bromide;

(3) adjusting pH value of the solution containing surface-treated metal nanoparticles to 10-11, heating in a water bath at a temperature of 50° C.-70° C., adding $Na_2SnO_3$ while stirring, then separating and drying to obtain $SnO_2$ powder coating metal nanoparticles;

(4) weighing compound used as source of Mg, compound used as source of Mn and the $SnO_2$ powder coating metal nanoparticles according to stoichiometric ratio, mixing well, elevating the temperature to 800° C.-1200° C. and calcining for 2-12 h, reducing at a temperature in the range of 1000° C.-1400° C. for 0.5-6 h, cooling with furnace to room temperature, obtaining manganese-doped magnesium stannate luminescent material.

Preferably, in step (1), concentration of the solution of metal salt is in a range of $1 \times 10^{-3}$ mol/L-$5 \times 10^{-2}$ mol/L.

Preferably, in step (1), the additive is at least one of polyvinylpyrrolidone, sodium citrate, cetyl trimethyl ammonium bromide, sodium dodecyl sulfate and sodium dodecyl sulfonate.

Preferably, in step (1), the additive is added in an amount sufficient to adjust the concentration of additive in obtained metal nanoparticles colloid to $1 \times 10^{-4}$ g/mL-$5 \times 10^{-2}$ g/mL.

Preferably, in step (1), the reducing agent is at least one of hydrazine hydrate, ascorbic acid, sodium citrate and sodium borohydride.

Preferably, in step (1), the reducing agent is an aqueous solution having a concentration in a range of $1 \times 10^{-4}$ mol/L-1 mol/L.

Preferably, molar ratio of reducing agent to metal ion is in a range of 3.6:1-18:1.

Under the premise of ensuring the obtaining of metal nanoparticles colloid, in order to save energy, the solution of metal salt is preferably reacted with additive and reducing agent for 10-45 min.

Preferably, in step (2), concentration of the solvent is in a range of 0.005 g/mL-0.1 g/mL.

Preferably, the step of adjusting pH value of solution containing surface-treated metal nanoparticles is adjusting pH value by adding NaOH solution.

Preferably, in step (3), pH value is adjusted to 10.5.

Preferably, in step (3), the heating temperature in a water bath is 60° C.

Preferably, in step (4), the compound used as source of Mg is selected from oxide of Mg, carbonate of Mg, acetate of Mg and oxalate of Mg.

Preferably, in step (4), the compound used as source of Mn is selected from oxide of Mn, carbonate of Mn, acetate of Mn and oxalate of Mn.

Preferably, in step (4), the step of reducing is conducted in reducing atmosphere consisting of at least one of mixed gases of $N_2$ and $H_2$, CO, and $H_2$.

Manganese-doped magnesium stannate luminescent material according to the present invention is a luminescent material having a core-shell structure. The structure is using metal nanoparticle M as a core, using $SnO_2$ an intermediate layer shell, and using $Mg_{2-x}SnO_4:Mn_x$ as an outer shell layer. This luminescent material has high internal quantum efficiency, great luminescent intensity, and the advantages of great stability and great luminescent properties. A method for preparing the manganese-doped magnesium stannate luminescent material has simple processes, low equipment requirements, and no pollution, is easy to control and applicable for industrial production, and has a broad application prospect.

BRIEF DESCRIPTION OF THE DRAWINGS

The FIGURE is cathodoluminescence spectra of $Mg_{1.994}SnO_4:Mn_{0.006}@SnO_2@Ag_{2.5\times10^{-4}}$ luminescent material coating metal nanoparticles Ag, compared with $Mg_{1.994}SnO_4:Mn_{0.006}$@$SnO_2$ luminescent material without coating metal nanoparticles, under 3 kv voltage, according to Example 3.

DETAILED DESCRIPTION OF ILLUSTRATED EMBODIMENTS

The present invention will be described below in detail referring to preferred embodiments. The technical scope of the present invention is not limited to these preferred embodiments.

Example 1

Preparation of $Mg_{1.95}SnO_4:Mn_{0.05}$@$SnO_2$@$Au_{1\times 10^{-2}}$ by high temperature solid state method A method for preparing manganese-doped magnesium stannate luminescent material comprises the following steps.

(1) Preparation of Au metal nanoparticles colloid. 20.6 mg of chloroauric acid ($AuCl_3 \cdot HNO_3 \cdot 4H_2O$) were dissolved in 16.8 mL of deionized water. After chloroauric acid dissolved completely, 14 mg of sodium citrate and 6 mg of cetyl trimethyl ammonium bromide were weighed and dissolved in the aqueous solution of chloroauric acid while magnetically stirring. 1.9 mg of sodium borohydride and 17.6 mg of ascorbic acid were separately dissolved in 10 mL of deionized water to obtain 10 mL of $5\times 10^{-3}$ mol/L aqueous solution of sodium borohydride and 10 mL of $1\times 10^{-2}$ mol/L aqueous solution of ascorbic acid. While magnetically stirring, 0.08 mL of aqueous solution of sodium borohydride was added into the aqueous solution of chloroauric acid. The reaction was performed for 5 min. Then 3.12 mL of $1\times 10^{-2}$ mol/L aqueous solution of ascorbic acid were added into the aqueous solution of chloroauric acid. Then reaction was performed for 30 min to obtain 20 mL of Au nanoparticles colloid containing $5\times 10^{-3}$ mol/L of Au.

(2) Preparation of $SnO_2$@$Au_{1\times 10^{-2}}$. 10 mL of $5\times 10^{-3}$ mol/L Au nanoparticles colloid were weighed and placed in a beaker, followed by adding 2 mL of 0.1 g/mL of aqueous solution of polyvinylpyrrolidone. After magnetically stirring for 8 h, surface-treated Au nanoparticles were obtained.

(3) NaOH solution was added into solution containing surface-treated metal nanoparticles to adjust pH value to 10.5. After stirring for 5 min, it was transferred to a water bath and heated at a constant temperature 60° C. Then 20 mL of 0.25 mol/L $Na_2SnO_3$ solution was added rapidly, then stirring for 3 h. After centrifugal separating and drying, $SnO_2$ powder coating metal nanoparticles (i.e. $SnO_2$@$Au_{1\times 10^{-2}}$, where y was $1\times 10^{-2}$) was obtained.

(4) Preparation of $Mg_{1.95}SnO_4:Mn_{0.05}$@$SnO_2$@$Au_{1\times 10^{-2}}$. 0.6552 g of $MgCO_3$, 0.0229 g of $MnCO_3$ and 0.6148 g of $SnO_2$@$Au_{1\times 10^{-2}}$ powder were weighed and grinded uniformly in an agate mortar. Then the powder were transferred into a corundum crucible and heated in a muffle furnace at 1200° C. for 2 h, followed by calcining in tube furnace at 1400° C. in reducing atmosphere of CO for 0.5 h. Cooling to room temperature, $Sr_{1.95}SnO_4:Mn_{0.05}$@$SnO_2$@$Au_{1\times 10^{-2}}$, manganese-doped magnesium stannate luminescent material coating metal nanoparticles was obtained.

Example 2

Preparation of $Mg_{1.992}SnO_4:Mn_{0.008}$@$SnO_2$@$Pd_{1\times 10^{-5}}$ by high-temperature solid-state method.

A method for preparing manganese-doped magnesium stannate luminescent material comprises the following steps.

(1) Preparation of Pd metal nanoparticles colloid. 0.22 mg of palladium chloride ($PdCl_2 \cdot 2H_2O$) was dissolved in 19 mL of deionized water. After palladium chloride dissolved completely, 11.0 mg of sodium citrate and 4.0 mg of sodium dodecyl sulfate were weighed and dissolved in the aqueous solution of palladium chloride while magnetically stirring. 3.8 mg of sodium borohydride were added into 10 mL of deionized water to produce a reducing solution of sodium borohydride having a concentration of $1\times 10^{-2}$ mol/L. While magnetically stirring, 1 mL of $1\times 10^{-2}$ mol/L aqueous solution of sodium borohydride was rapidly added into aqueous solution of palladium chloride. Then reaction was performed for 20 min to obtain 20 mL of Pd nanoparticles colloid containing $5\times 10^{-5}$ mol/L of Pd.

(2) Preparation of $SnO_2$@$Pd_{1\times 10^{-5}}$. (2) 1.5 mL of $5\times 10^{-5}$ mol/L Pd nanoparticles colloid were weighed and placed in a beaker, followed by adding 8 mL of 0.005 g/mL of aqueous solution of polyvinylpyrrolidone. After magnetically stirring for 16 h, surface-treated Pd nanoparticles were obtained.

(3) NaOH solution was added into solution containing surface-treated metal nanoparticles to adjust pH value to 10.5. After stirring for 10 min, it was transferred to a water bath and heated at a constant temperature 60° C. Then 25 mL of 0.3 mol/L $Na_2SnO_3$ solution was added rapidly, then stirring for 2 h. After centrifugal separating and drying, $SnO_2$ powder coating metal nanoparticles (i.e. $SnO_2$@$Pd_{1\times 10^{-5}}$, where y was $1\times 10^{-5}$) was obtained.

(4) Preparation of $Mg_{1.992}SnO_4:Mn_{0.008}$@$SnO_2$@$Pd_{1\times 10^{-5}}$. 1.1820 g of $MgC_2O_4 \cdot 2H_2O$, 0.0046 g of $MnC_2O_4 \cdot 2H_2O$ and 0.6030 g of $SnO_2$@$Pd_{1\times 10^{-5}}$ powder were weighed and grinded uniformly in an agate mortar. Then the powder were transferred into a corundum crucible and heated in a muffle furnace at 900° C. for 4 h, followed by calcining in tube furnace at 1300° C. in reducing atmosphere of 95% $N_2$ and 5% $H_2$ for 3 h. Cooling to room temperature, $Mg_{1.992}SnO_4:Mn_{0.008}$@$SnO_2$@$Pd_{1\times 10^{-5}}$, manganese-doped magnesium stannate luminescent material coating metal nanoparticles was obtained.

Example 3

Preparation of $Mg_{1.994}SnO_4:Mn_{0.006}$@$SnO_2$@$Ag_{2.5\times 10^{-4}}$ by high-temperature solid-state method.

A method for preparing manganese-doped magnesium stannate luminescent material comprises the following steps.

(1) Preparation of Ag metal nanoparticles colloid. 3.4 mg of silver nitrate ($AgNO_3$) was dissolved in 18.4 mL of deionized water. After silver nitrate dissolved completely, 42 mg of sodium citrate were weighed and dissolved in the aqueous solution of silver nitrate while magnetically stirring. 5.7 mg of sodium borohydride were dissolved in 10 mL of deionized water to produce an aqueous solution of sodium borohydride having a concentration of $1.5\times 10^{-2}$ mol/L. While magnetically stirring, 1.6 mL of $1.5\times 10^{-2}$ mol/L aqueous solution of sodium borohydride was added into aqueous solution of silver nitrate. Then reaction was performed for 10 min to obtain 20 mL of Ag nanoparticles colloid containing $1\times 10^{-3}$ mol/L of Ag.

(2) Preparation of $SnO_2$@$Ag_{2.5\times 10^{-4}}$. 1.2 mL of $1\times 10^{-3}$ mol/L Ag nanoparticles colloid were weighed and placed in a beaker, followed by adding 10 mL of 0.01 g/mL of aqueous solution of polyvinylpyrrolidone. After magnetically stirring for 12 h, surface-treated Ag nanoparticles were obtained.

(3) NaOH solution was added into solution containing surface-treated metal nanoparticles to adjust pH value to 10.5. After stirring for 5 min, it was transferred to a water bath and heated at a constant temperature 60° C. Then 15 mL of 0.32 mol/L $Na_2SnO_3$ solution was added rapidly, then stirring for 3 h. After centrifugal separating and drying, $SnO_2$ powder coating metal nanoparticles (i.e. $SnO_2@Ag_{2.5\times10^{-4}}$, where y was $2.5\times10^{-4}$) was obtained.

(4) Preparation of $Mg_{1.994}SnO_4:Mn_{0.006}@SnO_2@Ag_{2.5\times10^{-4}}$. 0.3214 g of MgO, 0.0059 g of $Mn(CH_3COO)_2.4H_2O$ and 0.6030 g of $SnO_2@Ag_{2.5\times10^{-4}}$ powder were weighed and grinded uniformly in an agate mortar. Then the powder were transferred into a corundum crucible and heated in a muffle furnace at 800° C. for 6 h, followed by calcining in tube furnace at 1200° C. in weak reducing atmosphere of 95% $N_2$ and 4% $H_2$ for 4 h. Cooling to room temperature, $Mg_{1.994}SnO_4:Mn_{0.006}@SnO_2@Ag_{2.5\times10^{-4}}$, manganese-doped magnesium stannate luminescent material coating metal nanoparticles was obtained.

The FIGURE is cathodoluminescence spectra of $Mg_{1.994}SnO_4:Mn_{0.006}@SnO_2@Ag_{2.5\times10^{-4}}$ luminescent material coating metal nanoparticles Ag (curve 1), compared with $Mg_{1.994}SnO_4:Mn_{0.006}@SnO_2$ luminescent material without coating metal nanoparticles (curve 2), under 3 kv voltage, according to this embodiment. It can be seen from the FIG. that the emission peak shown at 499 nm, luminescent intensity of the luminescent material coating metal nanoparticles is increased by 45%, compared to commercial luminescent material. Luminescent material of this embodiment has advantages of great stability, color purity and luminescent properties.

Example 4

Preparation of $Mg_{1.998}SnO_4:Mn_{0.002}@SnO_2@Pt_{5\times10^{-3}}$ by high-temperature solid-state method.

A method for preparing manganese-doped magnesium stannate luminescent material comprises the following steps.

(1) Preparation of Pt metal nanoparticles colloid. 25.9 mg of chloroplatinic acid ($H_2PtCl_6.6H_2O$) was dissolved in 17 mL of deionized water. After chloroplatinic acid dissolved completely, 40.0 mg of sodium citrate and 60.0 mg of sodium dodecyl sulfonate were weighed and dissolved in the aqueous solution of chloroplatinic acid while magnetically stirring. 1.9 mg of sodium borohydride was dissolved in 10 mL of deionized water to obtain 10 mL of $5\times10^{-3}$ mol/L aqueous solution of sodium borohydride. Separately, 10 mL of $5\times10^{-2}$ mol/L solution of hydrazine hydrate was prepared. While magnetically stirring, 0.4 mL of aqueous solution of sodium borohydride was added into the aqueous solution of chloroplatinic acid. The reaction was performed for 5 min. Then 2.6 mL of $5\times10^{-2}$ mol/L aqueous solution of hydrazine hydrate were added into the aqueous solution of chloroplatinic acid. Then reaction was performed for 40 min to obtain 10 mL of Pt nanoparticles colloid containing $2.5\times10^{-3}$ mol/L of Pt.

(2) Preparation of $SnO_2@Pt_{5\times10^{-3}}$. 8 mL of $2.5\times10^{-3}$ mol/L Pt nanoparticles colloid were weighed and placed in a beaker, followed by adding 4 mL of 0.02 g/mL of aqueous solution of polyvinylpyrrolidone. After magnetically stirring for 18 h, surface-treated Pt nanoparticles were obtained.

(3) NaOH solution was added into solution containing surface-treated metal nanoparticles to adjust pH value to 10. After stirring for 5 min, it was transferred to a water bath and heated at a constant temperature 50° C. Then 10 mL of 0.4 mol/L $Na_2SnO_3$ solution was added rapidly, then stirring for 5 h. After centrifugal separating and drying, $SnO_2$ powder coating metal nanoparticles (i.e. $SnO_2@Pt_{5\times10^{-3}}$, where y was $5\times10^{-3}$) was obtained.

(4) Preparation of $Mg_{1.998}SnO_4:Mn_{0.002}@SnO_2@Pt_{5\times10^{-3}}$. 1.7138 g of $Mg(CH_3COO)_2.4H_2O$, 0.0019 g of $Mn(CH_3COO)_2.4H_2O$ and 0.6028 g of $SnO_2@Ag_{2.5\times10^{-4}}$ powder were weighed and grinded uniformly in an agate mortar. Then the powder were transferred into a corundum crucible and heated in a muffle furnace at 800° C. for 12 h, followed by calcining in tube furnace at 1000° C. in reducing atmosphere of $H_2$ for 6 h. Cooling to room temperature, $Mg_{1.998}SnO_4:Mn_{0.002}@SnO_2@Pt_{5\times10^{-3}}$, manganese-doped magnesium stannate luminescent material coating metal nanoparticles was obtained.

Example 5

Preparation of $Mg_{1.98}SnO_4:Mn_{0.02}@SnO_2@Cu_{1\times10^{-4}}$ by high temperature method.

A method for preparing manganese-doped magnesium stannate luminescent material comprises the following steps.

(1) Preparation of Cu colloid. 1.6 mg of copper nitrate was dissolved in 16 mL of ethanol. After dissolved completely, 12 mg of polyvinylpyrrolidone were added while stirring, followed by dripping 4 mL of ethanol solution of sodium borohydride, which was prepared by dissolving 0.4 mg of sodium borohydride in 10 mL of ethanol. The reaction was performed for 10 min while stirring, then obtaining 20 mL of $4\times10^{-4}$ mol/L Cu colloid.

(2) Preparation of $SnO_2@Cu_{1\times10^{-4}}$. 1.5 mL of $4\times10^{-4}$ mol/L Cu colloid were weighed and placed in a beaker, followed by adding 5 mL of 0.03 g/mL of aqueous solution of polyvinylpyrrolidone. After magnetically stirring for 10 h, surface-treated Cu was obtained.

(3) NaOH solution was added into solution containing surface-treated metal nanoparticles to adjust pH value to 11. After stirring for 15 min, it was transferred to a water bath and heated at a constant temperature 70° C. Then 30 mL of 0.2 mol/L $Na_2SnO_3$ solution was added rapidly, then stirring for 1 h. After centrifugal separating and drying, $SnO_2$ powder coating metal nanoparticles (i.e. $SnO_2@Cu_{1\times10^{-4}}$, where y was $1\times10^{-4}$) was obtained.

(4) Preparation of $Mg_{1.98}SnO_4:Mn_{0.02}@SnO_2@Cu_{1\times10^{-4}}$. 1.6984 g of $Mg(CH_3COO)_2.4H_2O$, 0.0196 g of $Mn(CH_3COO)_2.4H_2O$ and 0.6028 g of $SO_2@Cu_{1\times10^{-4}}$ powder were weighed and grinded uniformly in an agate mortar. Then the powder were transferred into a corundum crucible and heated in a muffle furnace at 1000° C. for 5 h, followed by calcining in tube furnace at 1100° C. in reducing atmosphere of $H_2$ for 4 h. Cooling to room temperature, $Mg_{1.98}SnO_4:Mn_{0.02}@SnO_2@Cu_{1\times10^{-4}}$, manganese-doped magnesium stannate luminescent material coating metal nanoparticles was obtained.

Example 6

Preparation of $Mg_{1.99}SnO_4:Mn_{0.01}@SnO_2@(Ag_{0.5}/Au_{0.5})_{1.25\times10^{-3}}$ by high-temperature solid-state method.

A method for preparing manganese-doped magnesium stannate luminescent material comprises the following steps.

(1) Preparation of $Ag_{0.5}/Au_{0.5}$ nanoparticles colloid. 6.2 mg of chloroauric acid ($AuCl_3HCl.4H_2O$) and 2.5 mg of $AgNO_3$ were dissolved in 28 mL of deionized water. After dissolved completely, 22 mg of sodium citrate and 20 mg of polyvinylpyrrolidone were weighed and dissolved in the mixed solution while magnetically stirring. 5.7 mg of fresh-made sodium borohydride were dissolved in 10 mL of deionized water to produce an aqueous solution of sodium borohydride having a concentration of $1.5\times10^{-2}$ mol/L. While magnetically stirring, 2 mL of $1.5\times10^{-2}$ mol/L aqueous solution of sodium borohydride was added into the mixed solution previously prepared. Then reaction was performed for 20 min to obtain 30 mL of Ag/Au nanoparticles colloid containing $1\times10^{-3}$ mol/L of total metal.

(2) Preparation of $SnO_2@ (Ag_{0.5}/Au_{0.5})_{1.25\times10^{-3}}$ 5 mL of $1\times10^{-3}$ mol/L $Ag_{0.5}/Au_{0.5}$ nanoparticles colloid were weighed and placed in a beaker, followed by adding 10 mL of 0.1 g/mL of aqueous solution of polyvinylpyrrolidone. After magnetically stirring for 12 h, surface-treated $Ag_{0.5}/Au_{0.5}$ nanoparticles were obtained.

(3) NaOH solution was added into solution containing surface-treated metal nanoparticles to adjust pH value to 10.5. After stirring for 15 min, it was transferred to a water bath and heated at a constant temperature 60° C. Then 30 mL of 0.2 mol/L $Na_2SnO_3$ solution was added rapidly, then stirring for 1 h. After centrifugal separating and drying, $SnO_2$ powder coating metal nanoparticles (i.e. $SnO_2@ (Ag_{0.5}/Au_{0.5})_{1.25\times10^{-3}}$, where y was $1.25\times10^{-3}$) was obtained.

(4) Preparation of $Mg_{1.99}SnO_4:Mn_{0.01}@SnO_2@(Ag_{0.5}/Au_{0.5})_{1.25\times10^{-3}}$. 0.3186 g of MgO, 0.0098 g of $Mn(CH_3COO)_2 \cdot 4H_2O$ and 0.6028 g of $SnO_2@(Ag_{0.5}/Au_{0.5})_{1.25\times10^{-3}}$ powder were weighed and grinded uniformly in an agate mortar. Then the powder were transferred into a corundum crucible and heated in a muffle furnace at 1000° C. for 3 h, followed by calcining in tube furnace at 1250° C. in reducing atmosphere of $H_2$ for 5 h. Cooling to room temperature, $Mg_{1.99}SnO_4:Mn_{0.01}@SnO_2@(Ag_{0.5}/Au_{0.5})_{1.25\times10^{-3}}$, manganese-doped magnesium stannate luminescent material coating metal nanoparticles was obtained.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A manganese-doped magnesium stannate luminescent material having a chemical formula of $Mg_{2-x}SnO_4:Mn_x@SnO_2@M_y$, where @ denotes coating; $Mg_{2-x}SnO_4:Mn_x$ is outer shell layer; $SnO_2$ is intermediate layer shell; M is inner core; M is metal nanoparticle; M is at least one of Ag, Au, Pt, Pd and Cu; x is in a range of $0<x\leq0.05$; y is molar ratio of M to the amount of tin in $SnO_2$; y is in a range of $0<y\leq1\times10^{-2}$.

2. The manganese-doped magnesium stannate luminescent material of claim 1, wherein x is in a range of $0.002\leq x\leq0.008$, y is in a range of $1\times10^{-5}<y\leq1\times10^{-3}$.

3. A method for preparing manganese-doped magnesium stannate luminescent material, comprising:
(1) mixing solution of metal salt, additive with reducing agent, then reacting to produce metal nanoparticles colloid, the solution of metal salt is at least one solution of Ag salt, Au salt, Pt salt, Pd salt and Cu salt; the additive is at least one of polyvinylpyrrolidone, sodium citrate, cetyl trimethyl ammonium bromide, sodium dodecyl sulfate and sodium dodecyl sulfonate;
(2) adding the metal nanoparticles colloid into solvent and stirring to produce solution containing surface-treated metal nanoparticles; the solvent is selected from the group consisting of aqueous solution of polyvinylpyrrolidone, polyvinyl alcohol, polypropylene glycol and cetyl trimethyl ammonium bromide;
(3) adjusting pH value of the solution containing surface-treated metal nanoparticles to 10-11, heating in a water bath at a temperature of 50° C.-70° C., adding $Na_2SnO_3$ while stirring, then separating and drying to obtain $SnO_2$ powder coating metal nanoparticles;
(4) weighing compound used as source of Mg, compound used as source of Mn and the $SnO_2$ powder coating metal nanoparticles according to stoichiometric ratio, mixing well, elevating the temperature to 800° C.-1200° C. and calcining for 2-12 h, reducing at a temperature in the range of 1000° C.-1400° C. for 0.5-6 h, cooling with furnace to room temperature, obtaining manganese-doped magnesium stannate luminescent material.

4. The method for preparing manganese-doped magnesium stannate luminescent material of claim 3, wherein concentration of the solution of metal salt is in a range of $1\times10^{-3}$ mol/L-$5\times10^{-2}$ mol/L.

5. The method for preparing manganese-doped magnesium stannate luminescent material of claim 3, wherein the additive is added in an amount sufficient to adjust the concentration of additive in obtained metal nanoparticles colloid to $1\times10^{-4}$ g/mL-$5\times10^{-2}$ g/mL.

6. The method for preparing manganese-doped magnesium stannate luminescent material of claim 3, wherein the reducing agent is at least one of hydrazine hydrate, ascorbic acid, sodium citrate and sodium borohydride; reducing agent is an aqueous solution having a concentration in a range of $1\times10^{-4}$ mol/L-1 mol/L; molar ratio of reducing agent to metal ion is in a range of 3.6:1-18:1.

7. The method for preparing manganese-doped magnesium stannate luminescent material of claim 3, wherein the step (3) comprises: adjusting pH value of solution containing surface-treated metal nanoparticles to 10.5 by adding NaOH solution, heating in a water bath at 60° C., rapidly adding $Na_2SnO_3$ while stirring, then separating and drying to obtain $SnO_2$ powder coating metal nanoparticles.

8. The method for preparing manganese-doped magnesium stannate luminescent material of claim 3, wherein the compound used as source of Mg is selected from oxide of Mg, carbonate of Mg, acetate of Mg and oxalate of Mg.

9. The method for preparing manganese-doped magnesium stannate luminescent material of claim 3, wherein the compound used as source of Mn is selected from oxide of Mn, carbonate of Mn, acetate of Mn and oxalate of Mn.

10. The method for preparing manganese-doped magnesium stannate luminescent material of claim 3, wherein the step of reducing is conducted in reducing atmosphere consisting of at least one of mixed gases of $N_2$ and $H_2$, CO, and $H_2$.

* * * * *